United States Patent [19]

Sugao

[11] Patent Number: 4,784,311
[45] Date of Patent: Nov. 15, 1988

[54] PROCESS OF PRODUCING THICK-WALLED COMPOSITE METAL TUBING

[75] Inventor: Keizo Sugao, Shizuoka, Japan

[73] Assignee: Usui Kokusai Sangyo Kabushiki Kaisha, Shizuoka, Japan

[21] Appl. No.: 884,697

[22] Filed: Jul. 11, 1986

[30] Foreign Application Priority Data

Jul. 25, 1985 [JP] Japan .................. 60-163032

[51] Int. Cl.⁴ .................. B21D 39/04; B23K 1/00
[52] U.S. Cl. .................. 228/131; 29/516; 29/520; 138/142; 228/155; 228/173.2; 228/263.15
[58] Field of Search .................. 29/516, 520; 228/168, 228/173.2, 120, 126, 173.4, 231, 218, 131, 238, 155, 263.15; 138/142, 147, 140; 148/127

[56] References Cited

U.S. PATENT DOCUMENTS

| | | | |
|---|---|---|---|
| 674,394 | 5/1901 | Beck et al. .................. | 29/516 U X |
| 2,032,685 | 3/1936 | Coe .................. | 228/131 |
| 2,177,435 | 10/1939 | Kretz .................. | 228/131 |
| 2,473,686 | 6/1949 | Keene .................. | 228/263.15 X |
| 2,775,029 | 12/1956 | Bennett et al. .................. | 228/131 |
| 3,481,024 | 12/1969 | Bunn .................. | 228/131 X |
| 3,559,276 | 2/1971 | Anderson .................. | 228/263.15 X |
| 3,608,171 | 9/1971 | Stradtmann .................. | 138/142 X |
| 3,863,328 | 2/1975 | Arntz .................. | 29/516 |
| 4,125,924 | 11/1978 | Goetze et al. .................. | 29/516 X |
| 4,336,958 | 6/1982 | Goetzinger .................. | 228/263.15 X |

FOREIGN PATENT DOCUMENTS

| | | |
|---|---|---|
| 822983 | 1/1938 | France .................. 29/516 |
| 328 | 1/1964 | Japan . |
| 3325 | 2/1970 | Japan . |
| 34305 | 8/1980 | Japan . |
| 62614 | 5/1981 | Japan . |
| 195590 | 12/1982 | Japan .................. 228/173.4 |
| 2041810 | 9/1980 | United Kingdom .................. 228/263.15 |
| 2057313 | 4/1981 | United Kingdom .................. 228/173.2 |

Primary Examiner—Charlie T. Moon
Attorney, Agent, or Firm—Lowe, Price, LeBlanc, Becker & Shur

[57] ABSTRACT

A thick-walled composite metal tubing comprising an inner tubular member made of a steel pipe and an outer tubular member made of a carbon steel pipe which are press-fitted together with integration bonding thereof involving disappearance of the boundary interface at least in part of the inner and outer tubular members, and process for producing the same.

5 Claims, 4 Drawing Sheets (×200)

(×500)

(×25)

(×200)

PROCESS OF PRODUCING THICK-WALLED COMPOSITE METAL TUBING

BACKGROUND OF THE INVENTION

The present invention relates to a thick-walled and slender metal tubing having an external diameter of at most about 30 mm and, in particular, having its outer and inner tubular members press-fitted on each other, which is used in, for example, a high pressure fuel injection pipe for a fuel supply passage of a diesel engine.

DESCRIPTION OF THE PRIOR ART

As can been seen in, for example, a tubing for a high pressure fuel pipe, this type of composite metal tubing has heretofore been formed by a procedure which comprises the press-fitting of large and small diameter steel pipes, each having a copper plating film preliminarily provided around the circumferential mating surface thereof, and subsequent heat-treating of them to effect mutual brazing with the copper plating films as the filler which are present around the circumferential mating surfaces, or by a simple procedure comprising inserting a first pipe of two pipes having mutually different diameters into the other and mutually press-fitting them by solid drawing or the like.

However, according to the former of these conventional prior art procedures, complicated steps are needed because copper plating must be applied around the inner surface and the outer surface of the pipes, leading to increased production cost. In the case of stainless steel pipes, difficulties are encountered in plating and brazing. Thus, problems have been presented.

According to the latter prior art procedure, because the resulting configuration has the mating faces simply subjected to press-fitting, the mating circumferential interface disadvantageously undergoes a relaxation phenomenon leading to reduction of the mechanical strength when the composite tubing is used as a fuel injection pipe. This, coupled with vibration during revolution of an engine, often gives rise to cracking or breakage.

SUMMARY OF THE INVENTION

The present invention aims at solving the abovementioned problems of the prior art. As a result of intensive investigations, it has been found that the problems of the prior art can be solved by employing a technical constitution comprising the press-fitting of large and small diameter steel pipes to apply high surface pressure to the mating interface and subsequently heat-treating them in an oxidation-free atmosphere. Thus, the present invention has been completed.

According to the present invention, the bonding force in the mating interface common in the inner and outer pipes is increased as if an integrated tubing were formed. For example, when the tubing is subjected to forming to provide a joint head having a desired pattern in a product, a composite metal tubing resistant to high pressures and excellent in mechanical strength (for example, a high pressure fuel injection pipe for a diesel engine) is obtained.

The present invention will now be described. In the first aspect of the present invention, there is provided a thick walled composite metal tubing having a carbon steel pipe or a stainless steel pipe as the inner tubular member so press-fitted inside a carbon steel pipe as the outer tubular member as to allow the boundary interface between the inner and outer tubular members to disappear at least in part so as to attain integration bonding. On the other hand, in the second aspect of the present invention, there is provided a process for producing a thick-walled composite metal tubing, which comprises inserting of a small diameter carbon steel or stainless steel pipe into a large diameter carbon steel pipe, press-fitting the inner and outer pipes by drawing for effecting reduction of diameter, and heat-treating the inner and outer pipes in a furnace of a non-oxidizing atmosphere preferably at 1,000° to 1,200° C. to effect bonding of the mating faces thereof.

Figure 1:
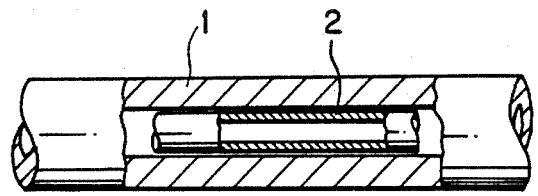
FIG. 1 is a principal part cross-sectional and broken view of the state of insertion of an inner tubular member into an outer member in the process.

1. represents an outer pipe
2. represents an inner pipe
3. represents a fixation plug, and
4. represents a die.

DETAILED DESCRIPTION OF THE INVENTION

In the present invention, a carbon steel pipe is used as the outer tubular member, while a carbon steel pipe or a stainless steel pipe is used as the inner tubular member. When a stainless steel pipe is used as the inner tubular member, cavitation erosion can be effectively prevented since the corrosion resistance and the mechanical strength are improved and the pressure-resistant strength is increased.

The outer diameter of the inner tubular member used as the material pipe is preferably so slightly smaller than the inner diameter of the outer tubular member as to facilitate the work of insertion of the inner tubular member into the outer tubular member and provide a space as small as possible between the outer circumferential surface of the inner tubular member and the inner circumferential surface of the outer tubular member in the state of insertion. The wall thickness of the inner tubular member is preferably 10 to 30% of the total wall thickness after drawing in order to provide a good press-fitting state of the mating interface after the drawing.

The drawing is desired to be performed by inserting a fixation plug inside the inner tubular member. The inner and outer tubular pipes are drawn to an integrated form through a mandrel at a cross-sectional reduction rate of 30 to 50% per drawing operation. This is because such a procedure can materialize close contact of the mating faces with maintenance of high surface pressure even after the drawing to allow the effect of the subsequent heat treatment to sufficiently develop.

The reason why the boundary interface between the inner and outer tubular members disappears at least in part to materialize integration bonding is believed to be that the integration bonding is achieved due to solid diffusion of a metal in the mating interface between the inner and outer tubular members as if the metal were fused.

As for the temperature conditions in the heat treatment, the preferred temperature is in a range of 1,000° to 1,200° C. At a temperature lower than 1,000° C., the bonding power of the inner and outer tubular members in the mating interface is weak, or no bonding is attained. At a temperature exceeding 1,200° C., the mechanical properties of the inner and outer pipes are downgraded and, is particular, the mechanical strength of a carbon steel pipe as the outer tubular member is unfavorably lowered.

The heating time is 2.5 to 20 minutes, preferably 5 to 15 minutes. When it is shorter than 2.5 minutes, bonding of the inner and outer tubular pipes in the mating interface is weak. A heating time exceeding 20 minutes is unnecessary and uneconomical.

The heat treatment must be performed under a non-oxidizing atmosphere. This is because foreign matters such as scales appear on the surfaces of the tubing when the heat treatment is performed in the presence of oxygen, with the result that the performance of the tubing according to the present invention is lowered when it is used as a high pressure fuel injection pipe. When the heat treatment is performed under the non-oxidizing atmosphere, a product having a high commercial value can be obtained since no surface contamination of the tubing occurs.

The non-oxidizing atmosphere can be materialized by using an inert gas such as nitrogen or argon, or a substantially oxygen-free gas mixture, for example, a gas mixture of nitrogen, hydrogen, carbon dioxide, and carbon monoxide.

Various kinds of heating furnaces such as an electric-heating furnace can be employed as the furnace of a non-oxidizing atmosphere.

The heat treatment is performed preferably while continuously supplying the tubing on a cycling mesh belt into the furnace.

ADVANTAGE OF THE INVENTION

The composite metal tubing of the present invention can be subjected to plastic deformation in bending or pressing just like a single material, since the inner and outer tubular members are press-fitted and formed into an integrated tubing with the mating faces thereof bonded to each other by the heat treatment. When this tubing is to be used as a high pressure fuel injection pipe, there occurs no buckling deformation due to of the inner tubular member in forming the head of the join end. Thus, a high pressure fuel injection pipe having a desired head pattern with a smooth inner flow passage is obtained.

According to the process of the present invention, no complicated treatment such as copper plating or brazing is needed, leading to reduction of manufacturing cost. Further, when a thin-walled stainless steel pipe is used as the inner tubular member, there is provided a thick-walled composite metal tubing having an excellent corrosion resistance and an improved strength against the internal flow pressure without an increase in the total material cost.

EMBODIMENT OF THE INVENTION

This invention will be more fully described by way of the following examples, but this invention is not limited only thereto.

EXAMPLE 1

Figure 2:
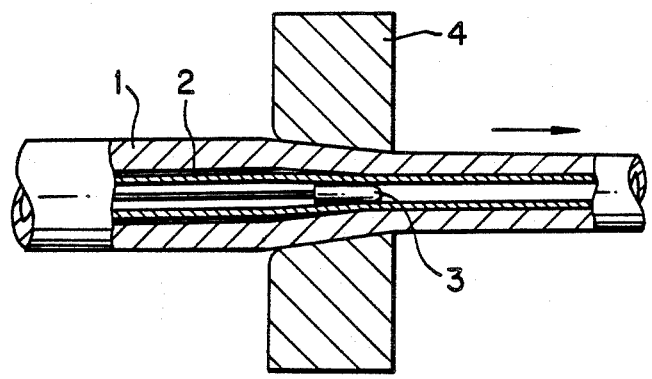
FIG. 2 is a principal part cross-sectional and broken view of the step of drawing work.

As shown in FIG. 1, a carbon steel pipe (1) of STS 38 having an external diameter of 90 mm and a wall thickness of 2.3 mm as the outer tubular member and a stainless steel pipe (2) of SUS 304 having an external diameter of 4.0 mm and a wall thickness of 0.4 mm were respectively degreased and washed with Tri-Clene, followed by a cleaning treatment of the outer tubular member on inner surface and the inner tubular member by brushing. Thus, foreign matter adhering to the inner circumferential surface of the outer tubular member and the outer circumferenrial surface of the inner tubular member, such as oils, fat and carbon scales, were removed. Thereafter, the inner tubular member (2) was inserted into the outer tubular member (1). As shown in FIG. 2, a fixation plug (3) was then inserted into the inner tubular member. The inner and outer tubular members were passed in an integrated form through a die (4), and drawn in the direction of the arrow with the tips thereof clamped. The diameter of the inlet of the mandrel was 12.00 mm, while the diameter of the outlet was 6.40 mm. Drawing reduction was performed at a cross-sectional reduction rate of 45% to obtain a composite tubing comprising the inner and outer pipes closely fitted on each other and having an external diameter of 6.35 mm and an internal diameter of 2.0 mm. The total wall thickness of the tubing was 2.175 mm, while the wall thickness of the inner pipe was 0.40 mm, which was 18.4% of the total wall thickness. Subsequently, the tubing was passed through a continuous heat treatment furnace of a non-oxidizing atmosphere, where it was heat-treated at a temperature of 1,100° C. and for a holding time of 5 minutes to produce a composite metal tubing having the mating faces integration-bonded to each other. An electric heating furnace was employed at the furnace, and filled with gas mixture of 62% nitrogen, 24% hydrogen, 6% carbon dioxide, and 8% carbon monoxide to provide a non-oxidizing atmosphere.

Figure 3:
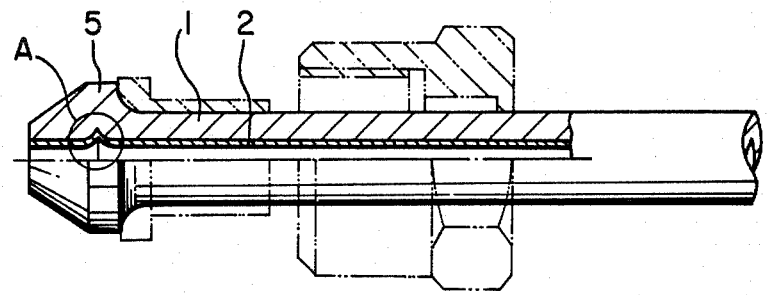
FIG. 3 is a partially broken cross-sectional view of a joint head formed as that of a high pressure fuel injection pipe from a thick-walled composite metal tubing according to the present invention.

The composite metal tubing thus produced can be formed into a pipe having a joint head (5) as shown in FIG. 3, which is usable as a high pressure fuel injection pipe.

Figure 4:
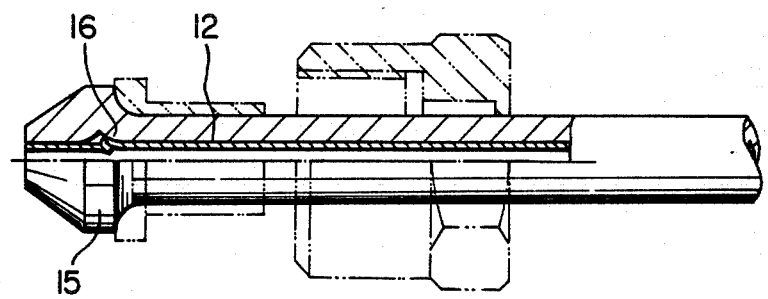
FIG. 4 is a partially broken cross-sectional view of a joint head formed as that of a high pressure fuel injection pipe from a conventional thick-walled composite metal tubing.

FIG. 4 shows a conventional tubing neither brazed nor heat-treated which involves a problem in performance in that, in forming a joint head (15) in the end portion of the tubing as a product, the inner tubular member (12) slips in the axial direction thereof to cause buckling deformation (16), whereby the fuel passage is narrowed.

As can be understood from FIGS. 3 and 4, an excellent effect is exhibited when the thick-walled composite metal tubing of the present invention is used as a high pressure fuel injection pipe.

Figure 5A:
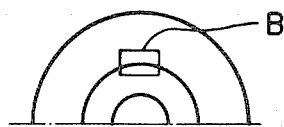
FIG. 5(a) is a cross-sectional view of the composite tube.
Figure 5B:
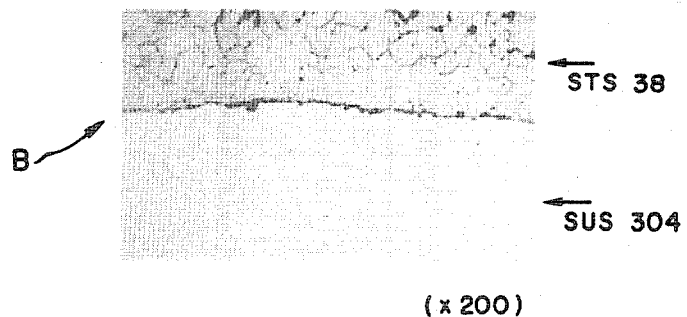
FIGS. 5(b) and 5(c) are microscopic photographs of a metallic texture in the cross-section of the mating portion in the present invention.
Figure 5C:
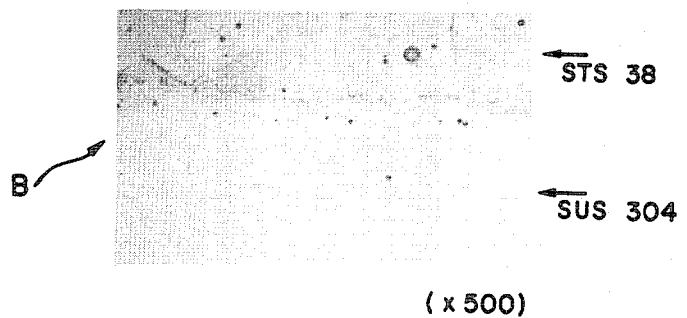

FIG. 5(a) is a cross-sectional view of tubes 1 and 2 with a cutout B, and FIGS. 5(b) and 5(c) show microscopic photographs in FIG. 5(c) of the cross-sections of the mating portions of composite metal tubings, of which the prior art (FIG. 5(b)) is one before the heat treatment as performed in Example 1, while FIG. 5(c) shows the composite metal tubing obtained in Example 1. As is apparent from FIG. 5(c), in contrast to the conventional rubing, the tubing of the present invention is integration-bonded with complete disappearance of the boundary interface between the inner and outer tubular members which interface assumed a dense structure. This microscopic photograph demonstrates that the mating faces of the inner and outer tubular members are integration-bonded to each other due to solid diffusion of the metal as if they were fused.

Figure 6A:
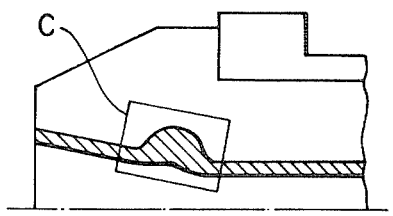
FIG. 6(a) is a cross-sectional view of the composite tube.
Figure 6B:
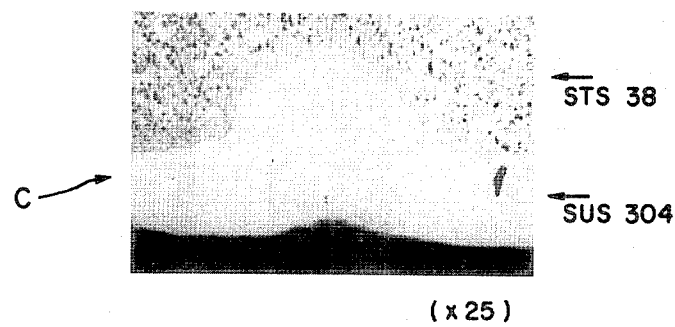
FIG. 6(b) is a microscopic photograph of a metallic texture in the cross-section of a pipe end portion formed from a tubing according to the present invention.

FIG. 6(a) is a cross-sectional view of tubes 1 and 2 with a cutout C, and FIG. 6(b) shows a microscopic photograph of the formed end portion of the tubing of the present invention, and more specifically an enlarged cross-sectional microscopic photograph of the proximity of the inner circumferential surface (corresponding to the portion A in FIG. 3) of the joint head pressed as that of a fuel injection pipe from the composite metal tubing obtained in Example 1. As is apparent from FIG. 6(b), the metal tubing of the present invention has the inner and outer tubular members integration-bonded to each other without any peeling in the boundary interface even after pressing.

EXAMPLE 2

A carbon steel pipe of STS 38 having an external diameter of 9.0 mm and a wall thickness of 2.0 mm as the outer tubular member and a carbon steel pipe of STS 38 having an external diameter of 4.6 mm and a wall thickness of 0.7 mm as the inner tubular member were respectively subjected to the same cleaning treatment as in Example 1, followed by insertion of the inner tubular member into the outer tubular member. Subsequently, a fixation plug was inserted into the inner tubular member by means of a pipe stretching apparatus. The inner and outer tubular members were passed in an integrated form through a die, where drawing was performed. Drawing reduction was performed at a cross-sectional reduction rate of 45% to obtain a composite tubing having the inner and outer tubular members closely fitted on each other and comprising an external diameter of 6.35 mm and an internal diameter of 2.0 mm. The tubing was passed through a continuous heat treatment furnace containing a non-oxidizing atmosphere, where it was heat-treated as a temperature of 1,050° C. for a holding time of 5 minutes. Thus, the composite metal tubing having the mating faces intergration-bonded to each other was produced.

EXAMPLE 3

Tubings having an external diameter of 6.35 mm and an internal diameter of 2.0 mm, which were produced in the same manner as in Example 1, were passed through a continuous heat treatment furnace containing a non-oxidizing atmosphere, where they were heat-treated at the varied temperatures for the varied heating times.

Table 1 shows the "relationship between the heat treatment temperature and the heating time" prepared by examining enlarged cross-sectional microscopic photographs showing the bonding state in the mating interface of each tubing with a mark X for the case of a clear boundary interface as a result of poor bonding of the inner and outer tubular members, a mark for the case of a disappeared boundary interface almost all over the region as a result of good bonding, and a mark Δ for the case of a boundary interface in an intermediate state between the above-mentioned two.

TABLE 1
Relationship between Heat Treatment Temperature and Heating time

| Heating time (min) | Heating temperature (°C.) | | | | | | |
|---|---|---|---|---|---|---|---|
| | 900 | 950 | 1000 | 1050 | 1100 | 1150 | 1200 |
| 20 | X | — | — | — | — | — | — |
| 15 | X | — | — | — | — | — | — |
| 10 | — | — | — | — | — | — | — |
| 7.5 | — | Δ | — | — | — | — | — |
| 5 | X | Δ | Δ | — | — | — | — |
| 2.5 | X | — | Δ | — | — | — | — |
| 1 | — | — | — | Δ | — | — | — |

"—": no testing conducted

As is apparent from Table 1, the heat treatment temperature is preferably 1,000° to 1,200° C., while the heating time is preferably 2.5 to 20 minutes, particularly preferably 5 to 15 minutes.

Figure 7:
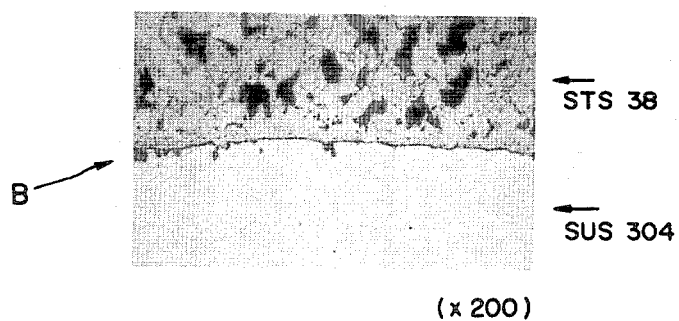
FIG. 7 is a microscopic photograph of a metallic texture in the cross-section of a mating portion of a pipe heat-treated at a heat treatment temperature of 900° C.

Good bounding cannot be secured at a heat treatment temperature lower than 1,000° C., for example 900° C. even when the heating time is prolonged. FIG. 7 is an enlarged cross-sectional microscopic photograph of a tubing obtained under the heat treatment conditions including a heat treatment temperature of 900° C. and a heating time of 5 minutes, and shows that the boundary interface between the inner and outer tubular members is clearly recognized with poor bonding.

I claim:

1. A process for producing a thick-walled composite metal fuel injection tubing which comprises inserting a small diameter steel pipe into a large diameter carbon steel pipe, subjecting the pipes to drawing to reduce the diameters and press-fit inner and outer tubular members resulting therefrom, and heat treating at 1000° to 1200° C. for at least 2.5 minutes and not more than 20 minutes the resulting press-fitted tubing in a furnace in non-oxidizing atmosphere to effect diffusion bonding of the mating faces of said inner and outer tubular members.

2. A process for producing a tubing as claimed in claim 1, wherein said small diameter steel pipe is made of carbon steel.

3. A process for producing a tubing as claimed in claim 1, wherein said small diameter steel pipe is made of stainless steel.

4. A process for producing a tubing as claimed in claim 1, wherein said drawing is performed by inserting a fixation plug into said small diameter pipe and passing said inner and outer tubular members in an integrated form through a mandrel.

5. A process for producing a tubing as claimed in claim 1, wherein said drawing is performed at a cross-sectional reduction rate of 30 to 50%.

* * * * *